United States Patent [19]

Howlett et al.

[11] Patent Number: 4,466,526

[45] Date of Patent: Aug. 21, 1984

[54] HELICOPTER ENGINE CONTROL WITH ROTOR SPEED DECAY ANTICIPATOR

[75] Inventors: James J. Howlett, North Haven; Raymond D. Zagranski, Somers, both of Conn.

[73] Assignee: Chandler Evans Inc., West Hartford, Conn.

[21] Appl. No.: 369,300

[22] Filed: Apr. 16, 1982

[51] Int. Cl.³ ..................... F16D 23/02; B60K 41/02
[52] U.S. Cl. .................................. 192/0.096; 123/325; 123/326; 416/30
[58] Field of Search ............... 192/0.03, 0.032, 0.033, 192/0.034, 0.076, 0.077, 0.084, 0.096, 3.58, 103 R; 361/238, 242, 243; 416/25, 26, 27, 30; 244/17.13, 17.11; 123/325, 326; 74/866

[56] References Cited

U.S. PATENT DOCUMENTS

| | | | |
|---|---|---|---|
| 2,961,052 | 11/1960 | Smith et al. | 416/30 |
| 2,991,618 | 7/1961 | Marscher et al. | 416/25 |
| 4,244,244 | 1/1981 | Rembold et al. | 74/866 |

Primary Examiner—George H. Krizmanich
Assistant Examiner—M. Manley
Attorney, Agent, or Firm—M. P. Williams; Gerald E. Linden

[57] ABSTRACT

The speed (54, 56) of the free turbine (40) of a helicopter engine (20) is compared (103) with the speed (105, 106) of the helicopter rotor (10) to indicate (101, 102) autorotation, and the deceleration (108) of the rotor above a threshold magnitude (110) is utilized (81, 68, 69) to increase fuel flow (72) to the engine in anticipation of rotor speed droop which would otherwise occur during recovery from the autorotation maneuver.

3 Claims, 1 Drawing Figure

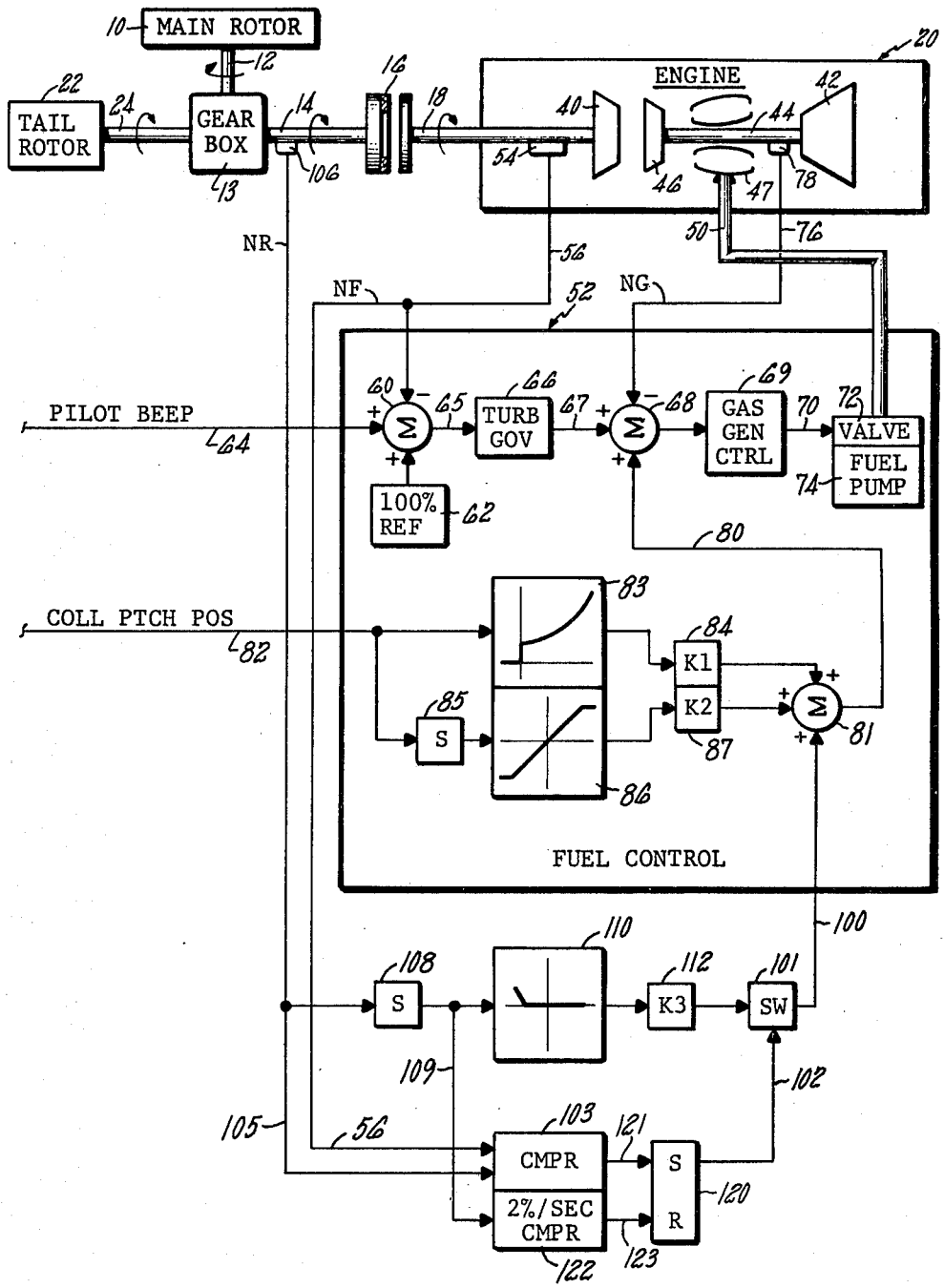

HELICOPTER ENGINE CONTROL WITH ROTOR SPEED DECAY ANTICIPATOR

The Government has rights in this invention pursuant to Contract No. DAAK51-80-C-0038 awarded by the Department of the Army.

DESCRIPTION

1. Technical Field

This invention relates to helicopters, and more particularly to means for anticipating decay in main rotor speed during autorotation and for controlling the engine in anticipation of reengagement with the main rotor so as to mitigate engine speed droop.

2. Background Art

In modern helicopters, the trend toward main rotor systems which have lower inertia reduces the level of stored energy in the rotor system and causes the rotor to be more susceptible to large transient speed excursions during some flight maneuvers. Such main rotor speed excursions, working in conjunction with other flight characteristics of helicopters, upset the attitude trim of the aircraft and either increase pilot workload or saturate the aircraft stability augmentation system, or both. In order to avoid such situations, pilots, either by advice or personal inhibition, avoid various quick maneuvers, typically those which generate high aircraft "g's", and thereby underutilize the maneuvering capability of the helicopter.

Consider, as one example, a quick turn evasive maneuver, in which airspeed kinetic energy is transferred into rotor torque to maintain or increase rotor speed. An autorotative state is reached and the main rotor is declutched from the rotor driving means (the engine). The engine then need supply only sufficient torque to drive any auxilliary equipment which is attached thereto on the engine side of the clutch. Thus, the engine is able to maintain rated speed with next to no torque. In the case of a free turbine gas engine, the free turbine speed governor is easily satisfied with the gas generator (turbocompressor) portion of the engine essentially at idle. When the pilot initiates a recovery from the turn, the rotor has used up a substantial portion of the aircraft kinetic energy and needs to recover engine power, rapidly, to maintain rotor speed. Typical current helicoptor engine fuel controls rely on inputs indicative of the collective pitch stick position and free turbine speed to control the fuel supplied to the gas generator, and thus the torque generating capability of the engine. But as the aircraft recovers from a quick turn, there is no change in collective pitch and the free turbine speed is easily maintained at rated speed with the gas generator at idle. However, during the recovery from the turn, main rotor decelerating torque builds rapidly, slowing the rotor from its autorotative level. At clutch reengagement, substantial torque is required, but until rotor speed dips below the reference speed, the governor will not require torque from the engine to balance the rotor torque requirement. At this time a high level of rotor deceleration exists which must be arrested by engine torque. Eventually, as speed dips below the reference speed, the governor causes fuel to be supplied to the engine in significant quantities to balance the torque loading on the rotor, arrest the rotor deceleration, and return the speed to reference speed. During this process, because of delays in getting the engine up to power, significant power turbine droops are encountered, and the drastic change in free turbine speed causes the engine fuel control to attempt to recover speed rapidly, thereby resulting in a torque overshoot. Thus, when recovering from an autorotative quick turn, the torque is initially too low and subsequently too high before the engine fuel control can settle down to drive the gas generator for the correct torque.

In typical helicopters, the stabilization of the aircraft against the torque reaction imposed by the engine on the airframe as a consequence of providing torque to the main rotor, is effected by means of a fixed coupling between the tail rotor collective pitch and the main rotor collective pitch. Thus, the engine speed droop encountered when recovering from a quick turn not only causes perturbations in aircraft speed and altitude due to the commensurate rotor speed droop, but also provides undesirable yaw moments as a consequence of inadequate tail rotor collective pitch (from coupling to main rotor collective pitch). These undesirable effects may also perturb the lateral and longitudinal trim of the aircraft, depending upon its design and flight characteristics.

As another example, consider arresting an autorotative descent. In attempting to arrest the descent, as the pilot pulls on the collective pitch stick, the main rotor (which is declutched from the engine during autorotation) slows down to a point where it reaches engine speed (nominally rated speed) at which time the main rotor is reclutched to the engine. However, as described hereinbefore, during autorotation the engine control is able to maintain rated free turbine speed with the gas generator substantially at idle. At the moment of reengagement with the main rotor, the free turbine is decelerated sharply, and the high collective pitch input imposes a severe torque demand on the free turbine. Thus, just as the pilot desires to have a high main rotor torque to complete arresting the descent and to either resume altitude or increase speed, there is a severe speed droop of the main rotor. As in the case of a quick turn, the drop in free turbine speed causes the engine control to rapidly increase the fuel to the gas generator, which in turn results in a torque overshoot. In this case, there is a collective pitch stick input to the engine control, but because the free turbine is idling along at rated speed, much of the collective pitch input may be canceled in the governor by the free turbine speed input in order to keep the decoupled free turbine from overspeeding. Thus, the gas generator may remain substantially at idle until the rapidly decelerating rotor couples through the clutch with the turbine, dropping the turbine speed below rated, thereby losing precious power recovery time. As in the case of a quick turn, the result is a significant transient rotor droop which stagnates the getaway and upsets the attitude trim of the aircraft.

Thus, the collective pitch input to the engine control, which anticipates engine torque requirement, is wholly ineffective following autorotation maneuvers in which the collective pitch stick position is maintained constant (such as a quick turn maneuver) and may be less than adequate in autorotation maneuvers which are terminated by a significant collective pitch input (such as arresting an autorotative descent).

DISCLOSURE OF INVENTION

Objects of the invention include provision of a helicopter engine control which anticipates deceleration of the main rotor and reengagement of the engine therewith at the conclusion of autorotative maneuvers, thereby to alleviate engine and main rotor speed droop.

According to the present invention, the speed of a helicopter main rotor is compared with that of the engine to determine the existence of autorotation, and the rate of change of speed of the main rotor is employed in the engine control to spool up the engine in anticipation of reengagement with the main rotor and the substantial torque requirement which normally follows. In an embodiment of the invention, the gas generator of a free turbine engine is spooled up from idle in response to deceleration of the main rotor indicative of the conclusion of an autorotative maneuver. In further accord with the present invention, only deceleration rates in excess of a predetermined threshold magnitude are employed in the engine fuel control to spool up the engine in anticipation of reengagement of the main rotor therewith, and the attendant torque requirement.

The present invention mitigates the effects of engine and rotor speed droop, including the upset of helicopter attitude trim which may result therefrom.

The invention may be readily implemented in helicopter systems of the type currently known to the art in a simple fashion, in the light of the teachings which follow hereinafter. The invention may be practiced in an analog or digital fashion, employing components and techniques which are well within the skill of the art. The invention may be implemented by means of a simple change in the program of a digital fuel control employing a microprocessor, or by a simple change in the computer of an automatic flight control system (if available); also, the invention may be implemented by the addition of simple analog circuitry or dedicated digital apparatus, as appropriate.

Other objects, features and advantages of the present invention will become more apparent in the light of the following detailed description of exemplary embodiments thereof, as illustrated in the accompanying drawing.

BRIEF DESCRIPTION OF DRAWING

The sole FIGURE herein is a simplified schematic block diagram of a helicopter rotor drive system in which the engine control is made responsive to an exemplary embodiment of the present invention.

BEST MODE FOR CARRYING OUT THE INVENTION

Referring now to the FIGURE, a main rotor 10 is connected through a shaft 12 to a gear box 13 which is driven by a shaft 14 through an overrunning clutch 16, which engages an output shaft 18 of an engine 20 when the engine speed equals or exceeds the rotor speed. The gear box 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control 52. The fuel control 52 typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. The other inputs to the summing junction 60 comprise the reference speed, which typically is a reference value indicative of 100% rated speed derived from a source 62 together with any pilot-desired variant therein as determined by a signal from the pilot's engine speed beeper on a line 64. The output of the summing junction 60 is a speed error signal on a line 65 which is applied to a turbine governor portion 66 of the fuel control, the output of which is a required gas generator speed signal on a line 67 which is fed to a summing junction 68 at the input of a gas generator control portion 69 of the fuel control. This provides a commanded fuel rate on a line 70 which is applied to a metering valve 72 so as to cause the correct amount of fuel from a fuel pump 74 to be applied to the fuel inlet lines 50, all in the well known way.

The summing junction 68 is also responsive to a signal indicative of gas generator speed (NG) on a line 76 which may be taken from a tachometer 78 responsive to the gas generator spool including the compressor 42, the shaft 44 and the turbine 46. Another input to the summing junction 68 is a line 80 from a summing junction 81, which provides a collective pitch input to the system. A signal on the line 82 indicative of collective pitch position (which may be a signal indicative of an angle of a collective pitch stick, representative of a given percent of full collective pitch authority) is provided through both proportional and derivative paths. The proportional path includes a function generator or schedule circuit 83 together with an amplifier 84 having a gain K1. The derivative path includes a differentiator 85, a limiter 86 and an amplifier 87 having a gain K2. The outputs of the amplifiers 84, 87 are applied to the summing junction 81. As collective pitch is changed, the derivative path 85-87 provides inputs to increase or decrease the normal turbine governor demand on the gas generator. Similarly, for collective pitch in excess of a predetermined threshold magnitude, the proportional path 83, 84 will provide steady state inputs to the fuel control. This is the type of collective pitch control over the engine which is described briefly hereinbefore.

All of the apparatus described thus far is simply exemplary of that known to the art.

In accordance with the present invention, an additional input is provided to the summing junction 81 on a signal line 100 which is indicative of a rotor deceleration rate greater than a threshold magnitude, during autorotation. The signal on the line 100 is provided through a switch 101 only when there is a signal on a line 102 to activate the switch. The signal on the line 102 in provided by a bistable device 120 which is set by a signal on a line 121 at the output of a comparator 103 whenever the rotor speed (NR) is greater than the free turbine speed (NF), indicating autorotation. The comparator 103 is responsive to the free turbine speed signal on the line 56 and to a main rotor speed signal on a line 105 which is provided by a tachometer 106 which may be responsive to the speed of the shaft 14 at the input to the gear box 13 as shown, or it may be made responsive to the main rotor shaft 12 or any other easily accessible shaft on the drive train, related to the rotor side of the clutch, so long as the gear ratio and gain of the system are properly adjusted. The rotor speed signal on the line 105 is applied to a differentiator 108 so as to provide a signal indicative of the rate of change of rotor speed on a line 109, which in turn is applied to a function generator or schedule 110 that provides an output only for rotor decelerations in excess of a predetermined magnitude. The output of the schedule 110 is applied through an amplifier 112 having a gain K3 and the switch 101 over the line 100 to the summing junction 81. The switch 101 may comprise an F.E.T. or other transistor switch as is known in the art. The bistable remains set until a comparator 122 provides a signal on a line 123 indicating that the rotor deceleration is nearly zero (e.g., about 2% rated speed per second). This allows maintaining the deceleration input after reengagement, if desired.

Whenever an autorotation maneuver is executed, the switch 101 will be enabled. At the conclusion of the maneuver, as the main rotor 10 spools down, the negative deceleration rate, once it exceeds a threshold magnitude, will cause an input to the summing junction 81 which in turn provides an additional input to the summing junction 68, thereby to cause the gas generator schedule to be increased providing more fuel to the engine so that the gas generator will spool up in anticipation of the required torque loading which will occur when the main rotor slows down to the same speed as the free turbine 40.

Although not shown, the speed and collective input signals are preferably filtered in a suitable known way; and the derivative (circuit 85) may have a low pass filter, to reduce noise, associated therewith. Although the invention is shown as being an add-on to an existing fuel control, it, of course, may be incorporated directly within the fuel control. Although shown in terms of analog function blocks, the invention may be implemented very easily with a simple computer program change to the program of a fuel control which is implemented digitally by means of a computer, or it may be incorporated as a simple program change within a digital, computerized automatic flight control system, if desired. Of course, the invention could be implemented with dedicated digital or analog hardware. The invention is described as it may be utilized with the fuel control of a free turbine gas engine. However, it may also be utilized with other types of engines, in an appropriate fashion which should be readily apparent to those skilled in the art in the light of the description hereinbefore. Also, a clutch indication, such as a switch, may be used in place of speed comparison to sense autorotation, if desired; but since speed on the rotor side of the clutch is used as the engine driving signal, comparison with engine speed is simpler. All of the foregoing changes and variations are irrelevant to the invention, it suffice that the helicopter main rotor-driving engine be controlled in response to main rotor deceleration during autorotation so as to anticipate the torque load which will be imparted thereto as the main rotor reengages with the engine.

Thus, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A helicopter, comprising:
    a rotor;
    an engine;
    rotor drive means including an overrunning clutch for connecting said rotor to said engine whenever the speed of said rotor does not exceed the speed of said engine; and
    engine control means for providing an engine speed signal indicative of the rotary speed of said engine, for providing a fuel command signal indicative of fuel flow required for desired engine operation, and for metering fuel flow to said engine in response to said fuel command signal;
    characterized by:
    rotor speed means for providing a rotor speed signal indicative of the rotary speed of said rotor; and
    said engine control means comprising means for providing, in response to said rotor speed signal, a rotor deceleration signal indicative of the deceleration of said rotor in excess of a predetermined threshold deceleration, for providing an autorotation signal indicative of said rotor being declutched from said engine, and for providing said fuel command signal with a fuel increase-indicating component in response to said rotor deceleration signal.

2. A helicopter according to claim 1, characterized by said engine control means comprising means responsive to said engine speed signal and to said rotor speed signal for providing said autorotation signal in response to said rotor speed signal indicating that the speed of said rotor exceeds the engine speed indicated by said engine speed signal.

3. A helicopter, comprising:
    a rotor;
    an engine;
    rotor drive means including an overrunning clutch for connecting said rotor to said engine whenever the speed of said rotor does not exceed the speed of said engine; and
    engine control means for providing an engine speed signal indicative of the rotary speed of said engine, for providing a fuel command signal indicative of fuel flow required for desired engine operation, and for metering fuel flow to said engine in response to said fuel command signal;
    characterized by:
    rotor speed means for providing a rotor speed signal indicative of the rotary speed of said rotor; and
    said engine control means comprising means for providing, in response to said rotor speed signal, a rotor deceleration signal indicative of the deceleration of said rotor in excess of a predetermined threshold deceleration, for providing an autorotation signal indicative of said rotor being declutched from said engine, and for providing said fuel command signal with a fuel increase-indicating component in response to said rotor deceleration signal in the presence of said autorotation signal and continuing thereafter until the rotor deceleration signal is nearly zero.

* * * * *

UNITED STATES PATENT AND TRADEMARK OFFICE
CERTIFICATE OF CORRECTION

PATENT NO. : 4,466,526

DATED : August 21, 1984

INVENTOR(S) : James J. Howlett et al

It is certified that error appears in the above-identified patent and that said Letters Patent is hereby corrected as shown below:

Column 4, line 54: After "102" change "in" to --is--

Column 6, claim 1, After "signal" insert --in the presence of line 28: said autorotation signal--

Signed and Sealed this

Twenty-first Day of January 1986

[SEAL]

Attest:

DONALD J. QUIGG

Attesting Officer

Commissioner of Patents and Trademarks